United States Patent [19]

Hendriks

[11] Patent Number: 5,328,031
[45] Date of Patent: Jul. 12, 1994

[54] METHOD OF PACKAGING AN EFFICIENT STRAND PACKAGE WITH HEXAGONAL CROSS SECTION

[75] Inventor: Ivo G. Hendriks, Overpelt, Belgium

[73] Assignee: Teepak, Inc., Westbrook, Ill.

[21] Appl. No.: 966,961

[22] Filed: Oct. 27, 1992

Related U.S. Application Data

[63] Continuation-in-part of Ser. No. 907,007, Jul. 1, 1992, Pat. No. 5,228,572, which is a continuation-in-part of Ser. No. 696,436, May 6, 1991, Pat. No. 5,137,153.

[51] Int. Cl.$^5$ .............................................. B65D 85/20
[52] U.S. Cl. .................................. 206/443; 206/802; 53/447
[58] Field of Search ............... 206/443, 427, 802, 499; 53/412, 444, 447, 148, 260, 258, 567, 576

[56] References Cited

U.S. PATENT DOCUMENTS

| | | | |
|---|---|---|---|
| 181,710 | 8/1876 | Palmer | 53/260 |
| 1,458,236 | 6/1923 | Morey et al. | 206/443 |
| 2,730,259 | 1/1956 | Frick | 217/43 |
| 3,206,020 | 9/1965 | Billingsley et al. | 206/65 |
| 3,220,583 | 11/1965 | Robertson | 214/152 |
| 3,471,305 | 10/1969 | Marbach | 99/176 |
| 3,616,989 | 11/1971 | Martinek et al. | 229/32 |
| 3,662,514 | 3/1972 | Goss | 53/567 |
| 3,735,767 | 5/1973 | Kruse et al. | 53/148 |
| 3,764,351 | 10/1973 | Whittington et al. | 206/46 F |
| 3,971,187 | 7/1976 | McNeill et al. | 53/21 FC |
| 4,295,563 | 10/1981 | Becker et al. | 206/205 |
| 4,514,956 | 5/1985 | Varallo et al. | 53/148 |
| 4,671,414 | 6/1987 | Bandt et al. | 206/802 |
| 4,796,754 | 1/1989 | Chaussadas et al. | 206/434 |
| 4,817,797 | 4/1989 | Hamelin | 206/428 |
| 4,938,006 | 7/1990 | Korsgaard | 53/576 |
| 5,095,960 | 3/1992 | Grundler et al. | 53/260 |
| 5,137,153 | 8/1992 | Hendriks | 206/443 |
| 5,228,572 | 7/1993 | Hendriks | 206/443 |

FOREIGN PATENT DOCUMENTS

| | | |
|---|---|---|
| 2019948 | 11/1971 | Fed. Rep. of Germany . |
| 2283063 | 3/1976 | France . |
| 191195 | 11/1937 | Switzerland . |

*Primary Examiner*—Steven N. Meyers
*Assistant Examiner*—Thomas P. Hilliard
*Attorney, Agent, or Firm*—Michael L. Dunn

[57] ABSTRACT

A method which comprises sequentially depositing individual shirred food casing strands into a holder, which, when filled, holds the strands in a desired configuration; stretching a tubular resilient plastic film having a stretched diameter large enough to accommodate the configuration and having a relaxed diameter small enough to tightly engage the external surfaces of strands located proximate the external surface of the configuration; inserting the configuration of strands into the tubular resilient plastic film when at least a portion of the film is so stretched and allowing the film to relax to tightly secure the strands in said configuration. The particular configuration comprises the configuration wherein, in the configuration, each strand has a strand diameter D, said strands being oriented such that central longitudinal axes of the strands are parallel; external surfaces of the strands contact external surfaces of adjacent strands; ends of the strands terminate in approximately the same plane; said plane being perpendicular to the longitudinal axes of the strands, lines passing perpendicularly through the central axes of strands located proximate the external surface of the configuration intersect to form a hexagon; and strands internally within the configuration encompassed by adjacent contact six adjacent strands; and the sides of the hexagon have side lengths such that said lengths vary by less than 1D from each other.

5 Claims, 7 Drawing Sheets

METHOD OF PACKAGING AN EFFICIENT STRAND PACKAGE WITH HEXAGONAL CROSS SECTION

BACKGROUND OF THE INVENTION

This is a continuation-in-part of U.S. patent application Ser. No. 07/907,007 filed Jul. 1, 1992, now U.S. Pat. No. 5,228,572 which in turn is a continuation-in-part of U.S. patent application Ser. No. 07/696,436 filed May 6, 1991, now U.S. Pat. No. 5,137,153.

This invention relates to packaging for shirred food casing strands. Food casings are used for packaging food products, especially meats such as sausages, but also for other food products, such as cheeses. When delivered to a meat packer, such strands are commonly in shirred form, i.e., folded in the form of a cylindrical strand, usually containing from 50 to 125 units of length of unshirred casing per unit length of shirred strand. When such casings are shirred, they are packaged for delivery to the meat packer, to protect the strand from contamination, accidental deshirring (unfolding), crushing, or strand breakage (i.e., breaking or deshirring of the strand between the ends of the strand such that the strand loses coherency and is no longer self supporting in folded form).

Several problems are encountered in prior art strand packaging. For example, such packaging tends not to pack the strands in the most space efficient organization; the strands tend to need significant external support; and protection, e.g., in the form of corrugated boxes; the strands do not protect each other from damage in the package as well as desired; the packages are often cumbersome to handle and empty, which often resulted in disorganized or damaged strands after removal, especially when being used on automatic machines; the cost of packaging has been higher than desired due to package strength requirements; and easily manageable numbers, e.g., 50 strands per package, were difficult to obtain in a space efficient package.

BRIEF DESCRIPTION OF THE INVENTION

In accordance with the present invention, there is therefore provided a space efficient strand package which effectively protects the strands during transfer from larger containers, holding such packages, to casing stuffing apparatus; which package needs significantly reduced strength requirements and is therefore less costly; which is easy to handle; from which strands are easily removed without damage while maintaining good alignment of the strands with each other along their longitudinal axes.

In accordance with the present invention there is provided a package comprising, shirred, essentially cylindrically shaped, food casing strands, each of which has a strand diameter D. The strands are oriented in the package in such a way that longitudinal axes of the strands are parallel, external surfaces of the strands contact external surfaces of adjacent strands and ends of the strands terminate in approximately the same plane, which plane is perpendicular to the longitudinal axes of the strands. The strands are further oriented so that lines passing perpendicularly through the central axes of strands located proximate the external surface of the package intersect to form a hexagon in a plane perpendicular to the longitudinal axes. Sides of the hexagon have side lengths such that the lengths vary by no more than 1 D from each other. Strands, internally within the package, i.e. which would not have an exteriorly exposed surface if all package wraps were removed, contact six adjacent strands.

The package usually consists essentially of, n rows of strands and an external package retainer, usually a package wrap. Preferably each of the lines forming the hexagon passes through the central axes of either an equal number of strands or a number of strands which do not vary by more than one. Preferably, the package according to the present invention has an odd number of rows n, which is a number of 5 to 15.

The invention further includes a method for packaging shirred essentially cylindrically shaped food casing strands in a particular configuration as described herein e.g. wherein, in the configuration, each strand has a strand diameter D, said strands being oriented such that central longitudinal axes of the strands are parallel; external surfaces of the strands contact external surfaces of adjacent strands; ends of the strands terminate in approximately the same plane; said plane being perpendicular to the longitudinal axes of the strands, lines passing perpendicularly through the central axes of strands located proximate the external surface of the configuration intersect to form a hexagon; and strands internally within the configuration encompassed by adjacent strands contact six adjacent strands; and the sides of the hexagon have side lengths such that said lengths vary by less than 1 D from each other. "Proximate the external surface" as used herein means that a straight line may be drawn through the center of the strand such that the line intersects at least two other strands, at least one of which is adjacent, which at least two other strands do not have contact with six strands at their external surfaces.

The method comprises sequentially depositing individual strands into a holder, which, when filled, holds the strands in said configuration; stretching a tubular resilient plastic film having a stretched diameter large enough to accommodate the configuration and having a relaxed diameter small enough to tightly engage the external surfaces of stands located proximate the external surface of the configuration; inserting the configuration of strands into the tubular resilient plastic film when at least a portion of the film is so stretched and allowing the film to relax to tightly secure the strands in said configuration.

In a preferred embodiment of the method, the configuration consists essentially of n rows of strands, where n is an odd number of rows and row number $(n/2+\frac{1}{2})$ contains one strand less than row number $(n/2)-\frac{1}{2}$ and as a further preferred embodiment the number of strands in rows 1 and $n=(n/2)-\frac{1}{2}$.

In the preferred embodiment at least a portion of the plastic film is stretched by means of a plurality of fingers inserted inside of the film which are then separated to stretch the film to a size which will accommodate the configuration. The film may be stretched either along the entire length of the packaging film to encompass the configuration or only a portion of the film may be stretched to permit insertion of the configuration into the film to be commenced so that the remainder of the film is stretched to a configuration retaining size as the configuration is forced into the film.

After the film is stretched, a pushing means pushes the configuration out of an open end of the container into an open end of the stretched film.

Where a portion of the film is stretched which will actually form a part of film which will be used to retain the configuration, after the configuration is pushed into the stretched film, the fingers are withdrawn thus permitting the film to relax and secure and retain the configuration. In such an embodiment, the fingers are preferably sized and positioned to fall in the spaces between the strands and the film to permit easy withdrawal.

DETAILED DESCRIPTION OF THE INVENTION

In accordance with a preferred embodiment of the present invention n is an odd number of rows and row number $(n/2)+\frac{1}{2}$ contains one strand less than row number $(n/2)-\frac{1}{2}$.

Further, in a preferred embodiment, the number of strands in rows 1 and $n=(n/2)-\frac{1}{2}$ or $(n/2)+\frac{1}{2}$ and the number of strands in center row number $(n/2)+\frac{1}{2}=n-3$ or $n-2$ and is one less than the number of strands in row number $(n/2)-\frac{1}{2}$.

The shirred casings within the product are most commonly used to package food, e.g., sausages in the form of hot dogs, salami, bologna, etc. Such casings are also commonly used to package lunch meats such as composite pressed ham and products such as cheeses. By shirred strand is meant a tubular casing product which has been folded or pleated in such a way that it has been compressed along its longitudinal axis to from one fiftieth (1/50) to one two hundredth (1/200) of its unshirred length and usually to one sixtieth (1/60) to one one hundred twenty fifth (1/125) of its unshirred length.

The shirred casing strands may be of any food casing material, e.g., regenerated cellulose, collagen, or fibrous, i.e., regenerated cellulose impregnated paper. As can be seen in the figures, the shirred food casing strands 12, are essentially cylindrical in shape and are oriented in the package 10 such that longitudinal axes 14 of the strands 12 are parallel within the package. External surfaces 16 of the strands contact external surfaces of adjacent strands and when a strand is entirely embedded within the package, the external surface of the strand contacts six adjacent strands in a stable space efficient configuration. Ends 18 of the strands terminate in a plane 20 perpendicular to the longitudinal axes 14 of strands 12. Such a plane may be considered as represented by FIG. 1.

The package has a retaining means, usually a package wrap, for securing the strands within the package in the previously described orientation. The package wrap may be of any suitable material, e.g. plastic film, for retaining the strand orientation and for protecting the strands.

Figure 1:
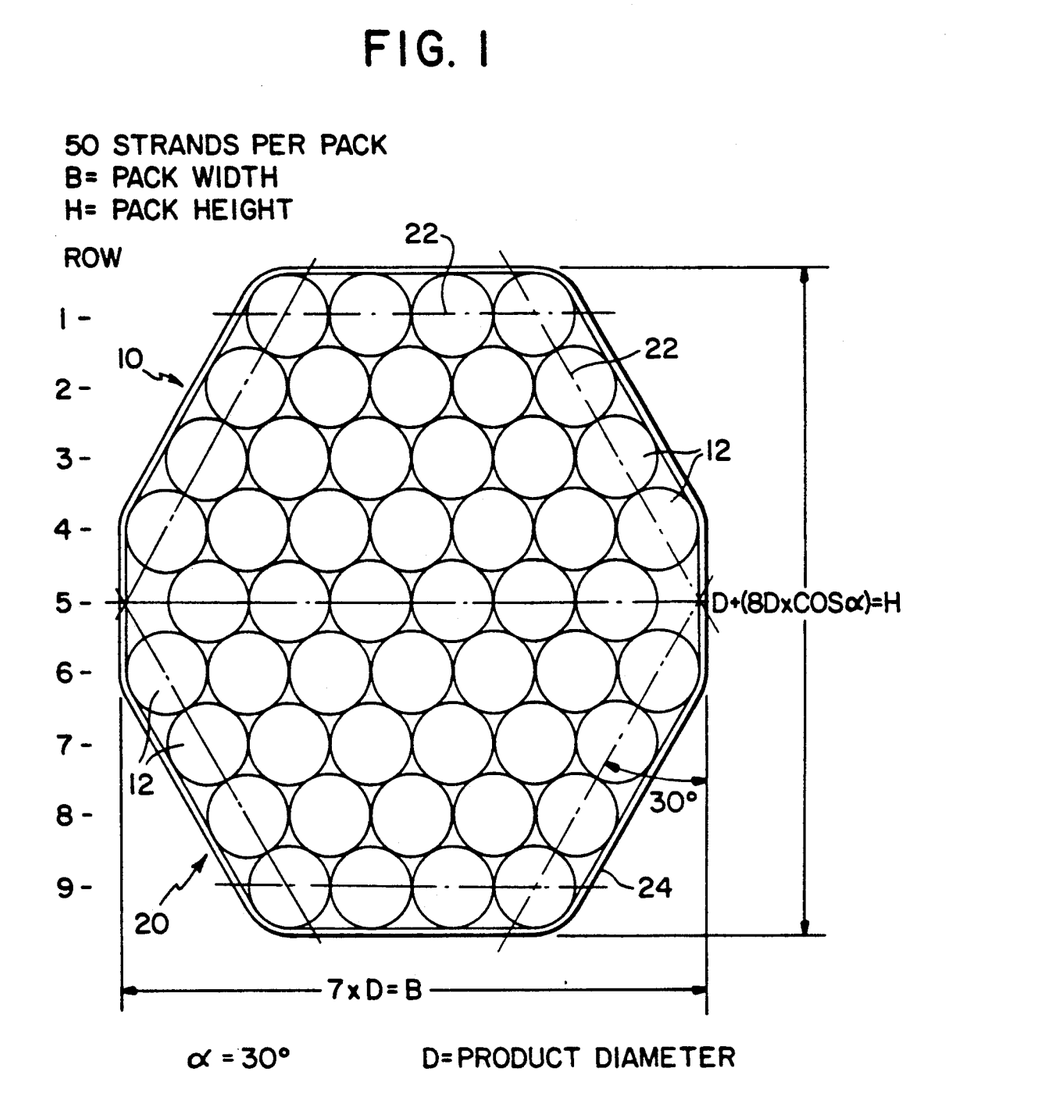
FIG. 1 shows an end view of a preferred embodiment of the package of the invention.
Figure 2:
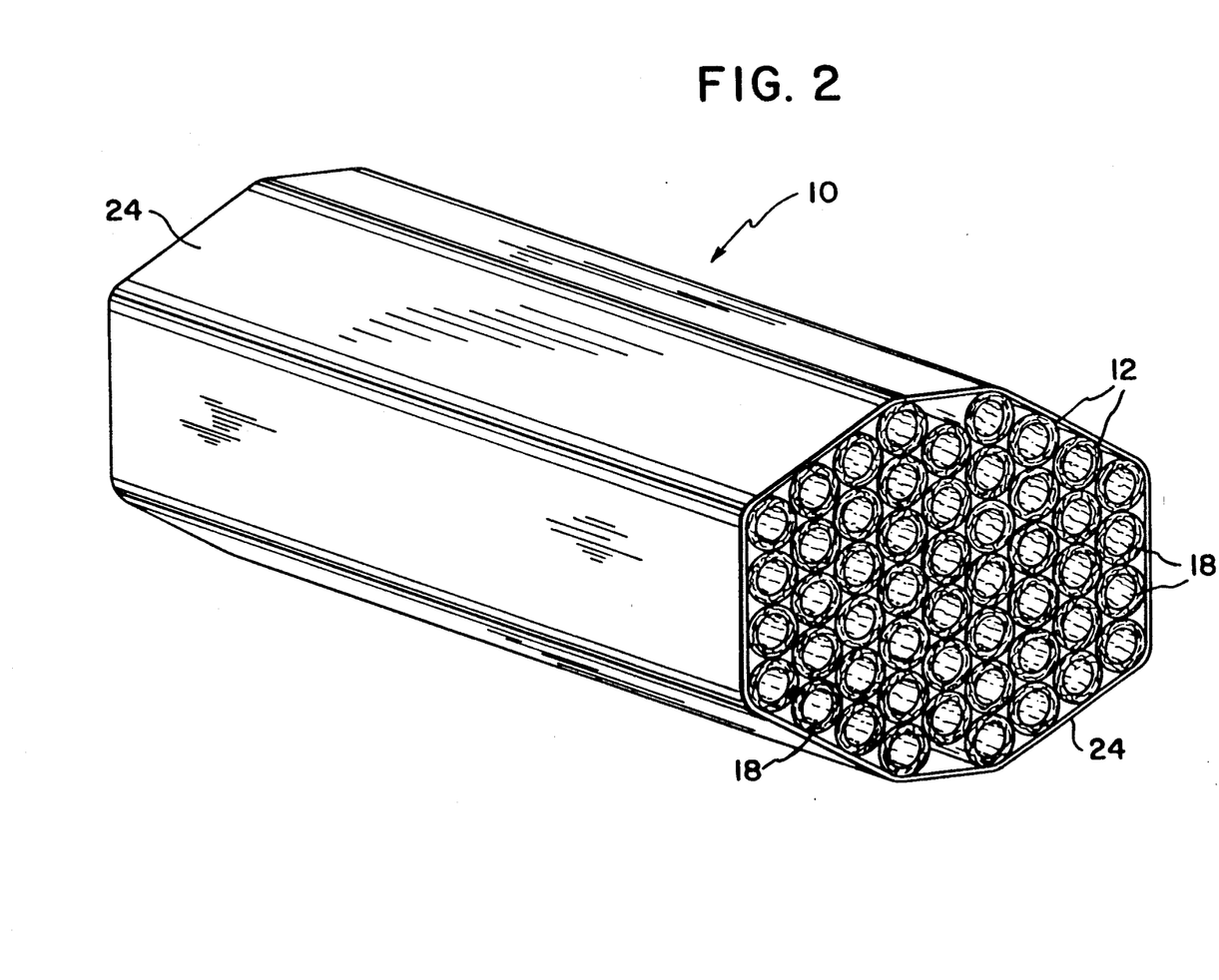
FIG. 2 shows the same package as FIG. 1 in a perspective view.
Figure 3:
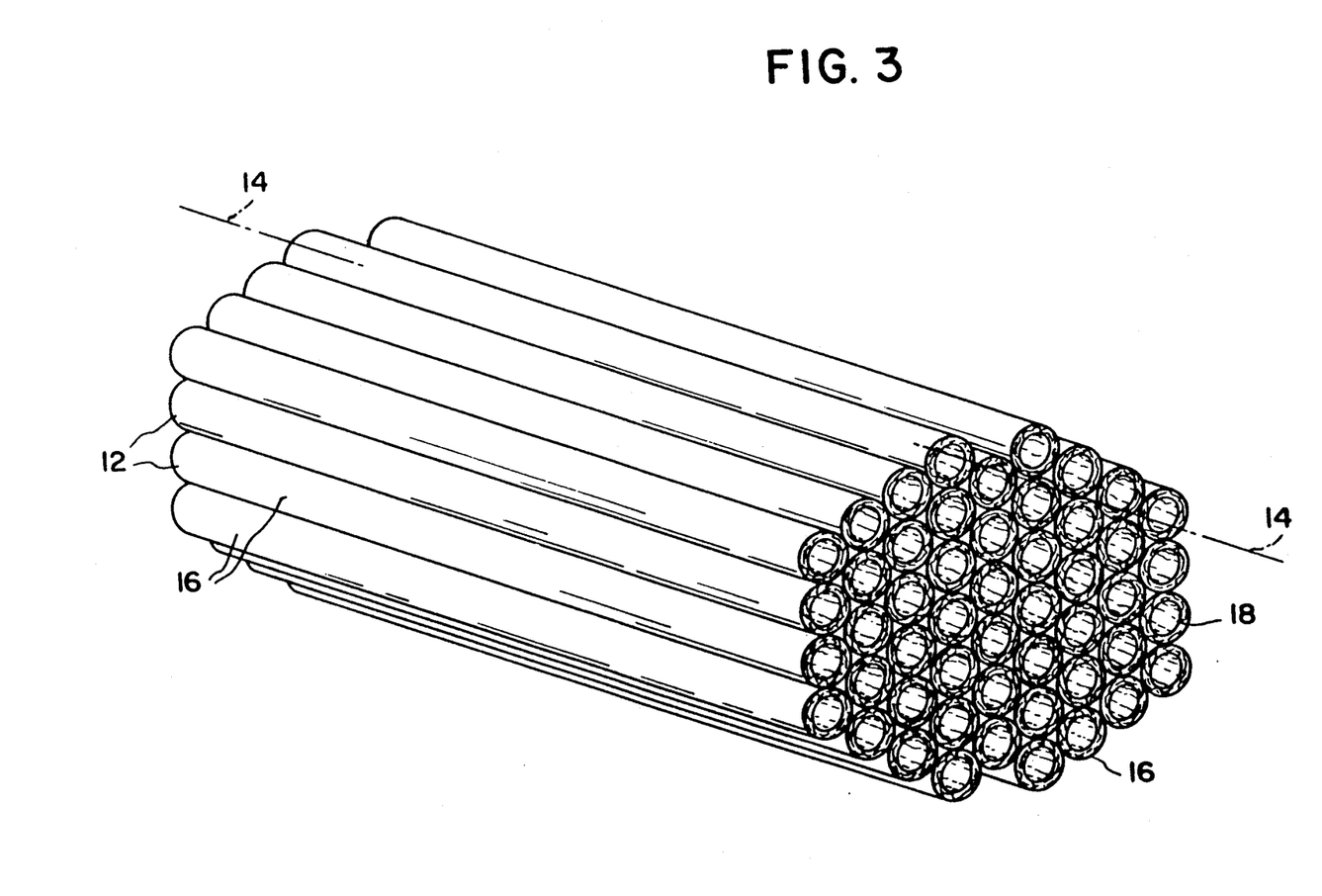
FIG. 3 is the perspective view of FIG. 2 with the wrap removed.

As shown in FIGS. 1-3 which illustrate a 50 strand preferred embodiment of the invention, a package 10 is provided which comprises 50 strands 12, of a shirred casing product.

As seen in FIG. 1, lines 22 passing through the longitudinal axes of strands 12 intersect to form a hexagon. The package width B, as shown in FIG. 1 may be represented by seven times the diameter of the strands and package height H may be represented by the formula.

$$H = D + (8D \times \cos a)$$

where, as shown in FIG. 1, $a=30°$, H=height, D=the strand diameter.

As seen in the drawings, with respect to the nine row package, especially FIG. 1, the strands within the package are organized into nine strand rows. The first and ninth rows contain four strands, the second and eighth rows contain five strands, the third and seventh rows contain six strands, the fourth and sixth rows contain seven strands and the fifth row, also being the center row, contains six strands.

It may be noted that the number of strands in row number $(n/2)+\frac{1}{2}$, i.e. row number $(9/2)+\frac{1}{2}$=row number 5 contains six strands which is one strand les than the seven strands contained in row number $(n/2)-\frac{1}{2}$, i.e. row number 4.

Further it may be noted that the number of strands in rows 1 and n, i.e. 1 and $9=(n/2)-\frac{1}{2}=9/2-\frac{1}{2}=4$ strands.

Further the number of strands in center row number $(n/2)+\frac{1}{2}$ i.e. $(9/2)+\frac{1}{2}=5$ is $n-3$, i.e. 6 strands.

Figure 4:
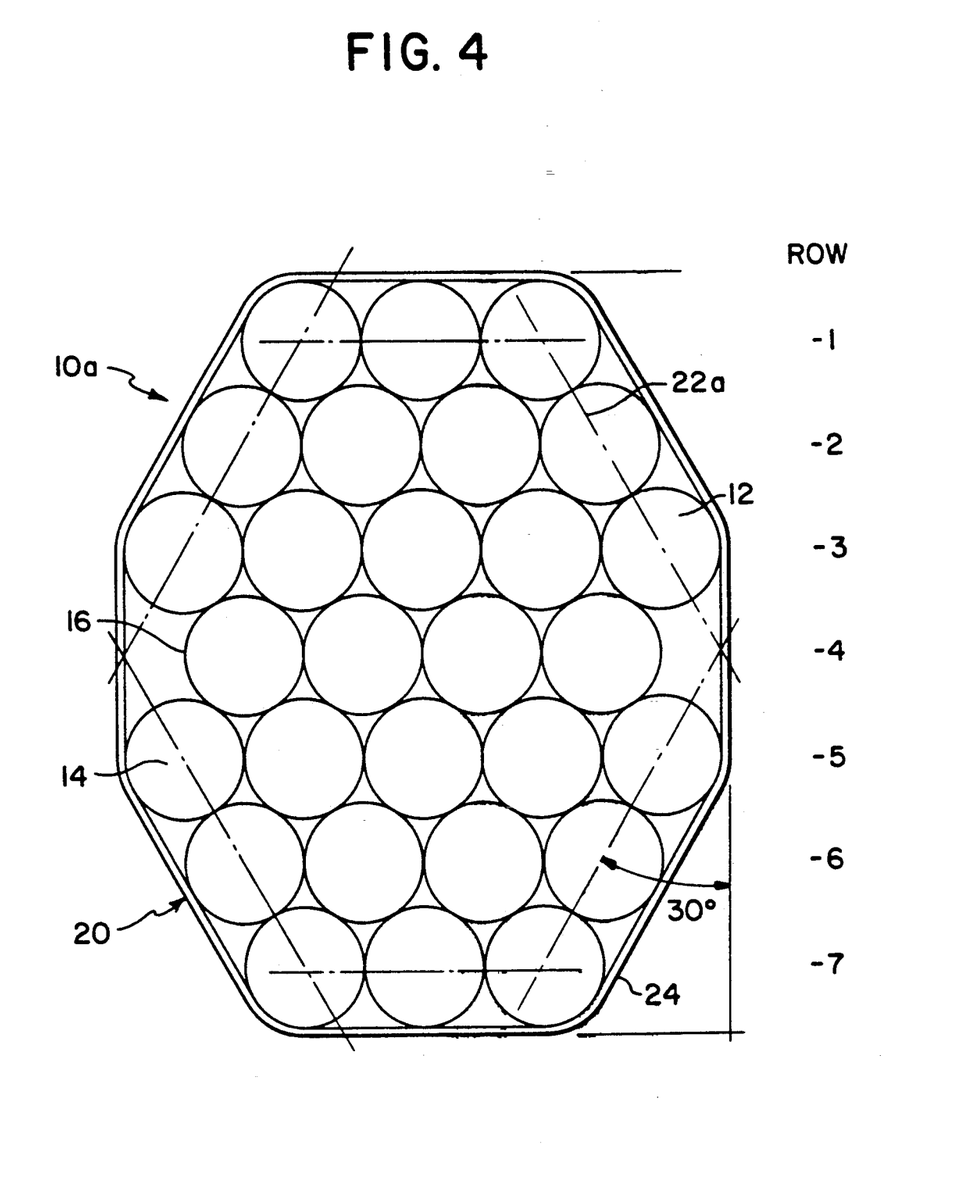
FIG. 4 shows a cross sectional view of an alternative embodiment of the invention.

In a further preferred embodiment as shown in FIG. 4, strand package 10a contains 28 strands and has seven rows.

The strands 12 are in cylindrical shape and are oriented in the package 10a such that longitudinal axes 14 of strands 12 are parallel within the package. Again external surfaces 16 of the strands contact external surfaces of adjacent strands and when a strand is entirely embedded within the package it contacts six adjacent strands. Lines 22a passing through the longitudinal axes of strands 12 intersect to form a hexagon.

The package width B may be represented by six times the strand diameter D and the package height may be represented by the formula $H = D + (6D \times \cos a)$ where $a=30°$, H=height and D=strand diameter.

In general, for packages of the preferred embodiments of the present invention, where the lines pass through an equal number of strands, package width $B=(n-2)D$ and where the lines in rows 1 and n pass through one more strand than the remaining lines $B=(n-1)D$. Package height $H=D+(n-1)D \cos a$, where n=the number of rows in the package.

Again with respect to the embodiment shown in FIG. 4, the number of strands in row number $(n/2)+\frac{1}{2}$, i.e. 4 strands is one strand less than the number of strands in row number $(n/2)-\frac{1}{2}$, i.e. 5 strands. The number of strands in rows 1 and n, i.e. 1 and $7, =(n/2)-\frac{1}{2}=((7/2)-\frac{1}{2})=3$. And the number of strands in center row $(n/2)+\frac{1}{2}=n-3$, i.e. row number four contains $7-3=$ four strands.

Figure 5:
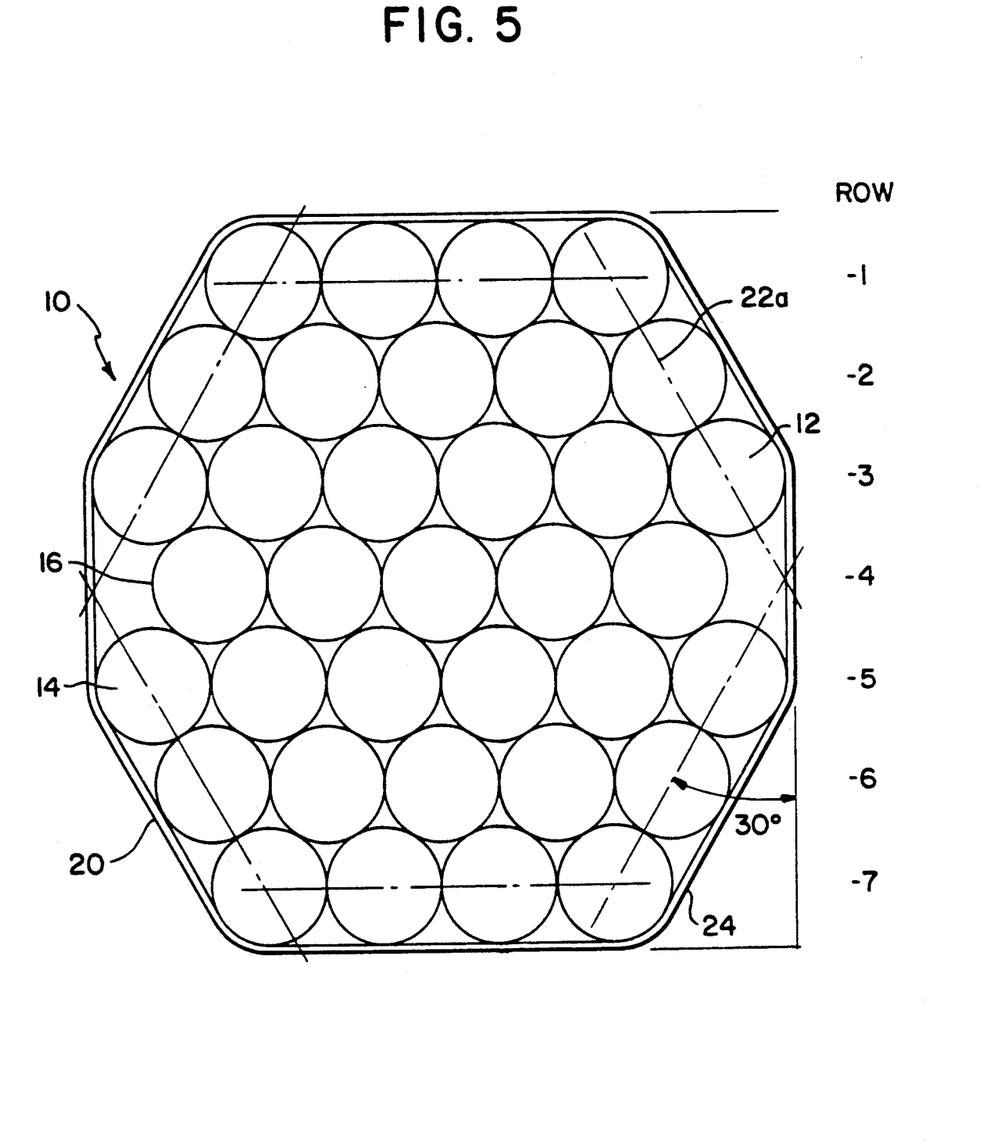
FIG. 5 shows a cross sectional view of a further alternative embodiment of the invention.

A further embodiment is shown in FIG. 5 wherein the package has n=seven rows and rows 1 and n each have $(n/2)+\frac{1}{2}$ strands and the number of strands in row $(n/2)+\frac{1}{2}=n-2$.

The package, as seen in FIGS. 1, 2, 4 and 5 has an external retaining means 24 which provides radial pressure to hold the strand package together. The retaining means is usually a wrap of paper or plastic film which simultaneously provides protection for the strands, but may also be another form of retaining means, such as a net or bands.

The ends of the package may optionally be sealed to provide moisture retention and the strand packages may be further packaged in a carton or other container in quantities of one or more. Two packages to a carton would, for example, provide 100 strands to a carton.

As can be readily seen, the strand package of the invention provides efficient packing of strands; is very stable, provides strand protection; utilizes very little packaging material in addition to the strands themselves; can be readily opened simply by removing the retaining means which allows removal from the package, for example within the hopper of an automated casing filling machine; yet, the cost of the package is relatively low when compared with previous packaging methods for shirred casing strands.

In accordance with the method of the invention, it is to be understood that essentially any suitable tubular film may be used. Films which are contemplated in accordance with the invention therefore include heat shrink tubular films which have a size large enough to accommodate the desired strand configuration and which shrink at elevated temperatures low enough to avoid damage to the strands, to a size which securely retains the configuration. In addition a particularly preferred tubular film is a film made of a resilient plastic material which may be physically stretched to a size which will accommodate the desired strand configuration but which will return to a size which will retain the strand configuration when stretching force is released.

Figures 6, 7, 8:
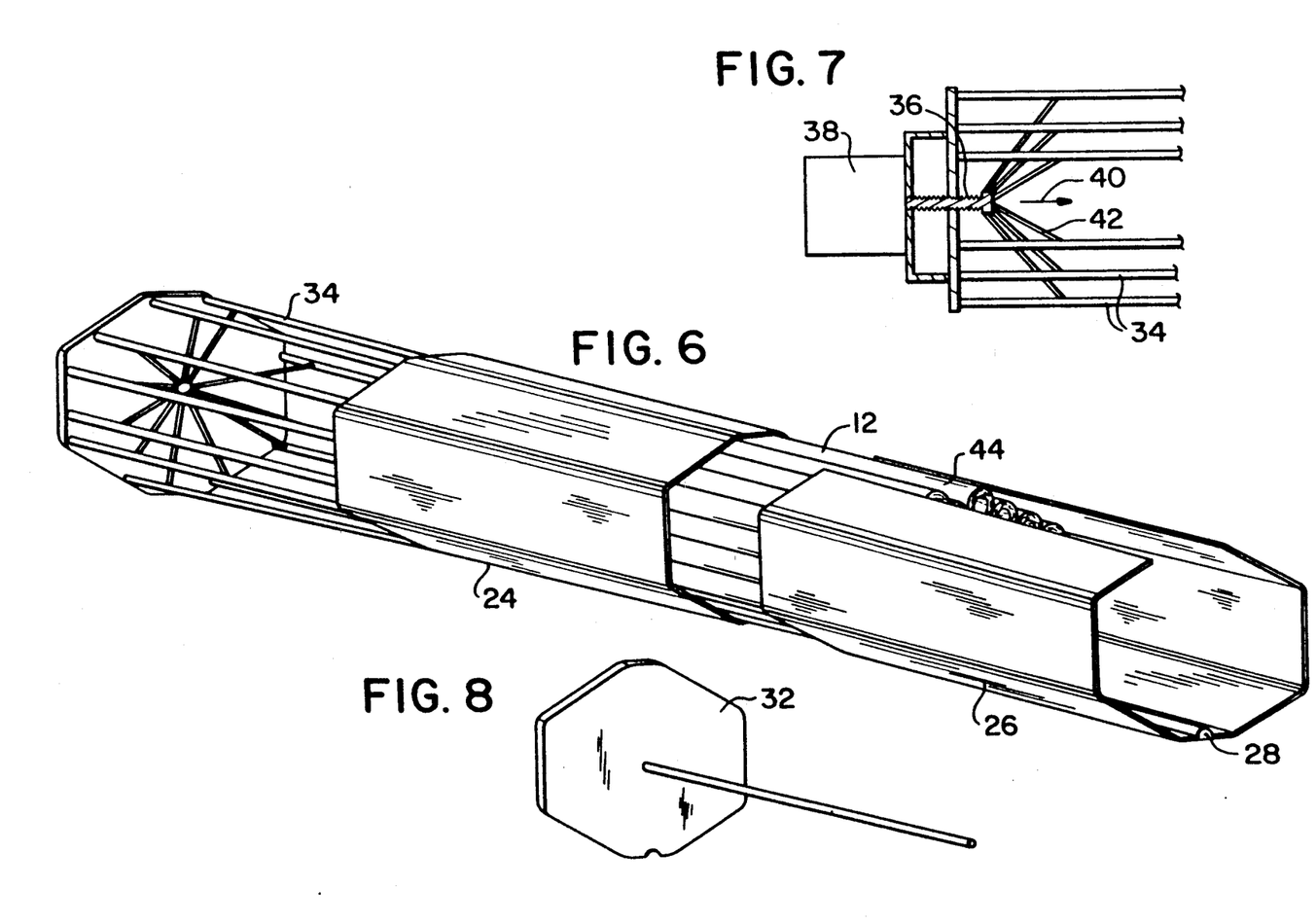
FIG. 6 is a perspective view showing a container for receiving and orienting strands, a stretched film and fingers for stretching the film.
FIG. 7 is a cross sectional view of fingers for stretching the film.
FIG. 8 is a pusher for forcing the strands from the container into the tubular film.
Figure 9:
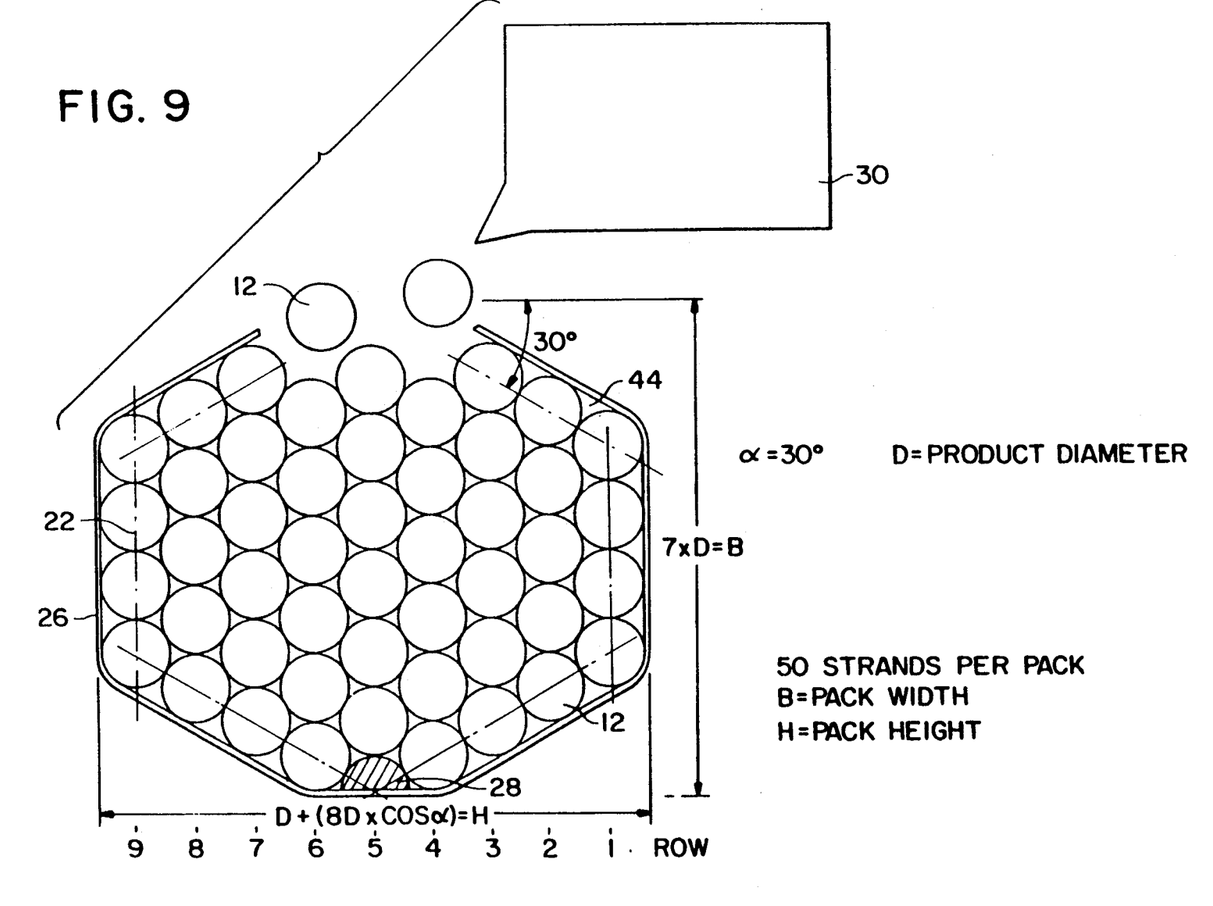
FIG. 9 is a container for receiving and orienting strands in the desired configuration.

As can be seen in FIGS. 6 and 9, in accordance with the method of the invention, a container 26 is provided, which when filled orients the strands in the configuration desired in accordance with the present invention. To assist in such orientation, the bottom of the container is provided with a hemispherical portion 28 which causes the center row to contain one less strand than adjacent rows. Optionally, as the strands are introduced into container 26, container 26 may be shaken to encourage the strands to settle into the desired orientation.

Means is provided to introduce the strands into the container 26, which may be done manually or automatically. Many such means can be envisioned, e.g. a conveyer means or a hopper above the container. In any case the strands are desirably dropped individually so that they do not interfere with each other in reaching the desired orientation. Such a means is shown in FIG. 9 as hopper 30.

A plastic wrap 24 is provided which is held open by any suitable means to permit the strand configuration to be pushed from the container 26 by any suitable means, e.g. pusher 32 into the interior of plastic wrap 24. Regardless of whether the plastic wrap material is a shrink wrap material or a resilient material, the wrap is held open to permit the strand configuration to at least be introduced into the wrap. Various means can be envisioned by one skilled in the art for holding the wrap open and, in the case of a resilient wrap, of stretching the wrap to a large enough size to at least commence introduction of the configuration into the wrap. As shown in FIGS. 6 and 7, one possible embodiment is a set of fingers 34 upon which the wrap is extended to hold it open. Once the wrap is in place on the fingers, the fingers may be expanded away from each other by turning screw 36 manually or by using drive means 38 in the form of a gear motor. As screw 36 moves in the direction of arrow 40, arms 42 force fingers 34 apart thus expanding wrap 24. In such an embodiment, fingers 34 are desirably sized and positioned so that they fit within spaces 44 between strands to allow easy withdrawal of the fingers after insertion of the configuration into the wrap and the fingers relaxed by turning screw 36 so that it moves in a direction opposite arrow 40.

It is to be understood that the figures are for purposes of illustration only. For example, and perhaps even preferably, only one end of the wrap may be stretched, e.g. by fingers or plates attached to a frame and the configuration passed through the opening between the fingers or plates into the wrap past the fingers or plates so that the fingers or plates cannot become trapped between the wrap and the strands. In such an embodiment forcing the configuration from the container 26 into a previously unstretched portion of the wrap effectively stretches the wrap sufficiently to encompass and retain the configuration. Optionally the wrap may be shirred or folded about a tubular mandrel such that the mandrel passes through the tubular plastic wrap and such that the configuration passes through the fingers which stretch and hold the end of the wrap open into which the configuration initially enters and such that the configuration passes through the mandrel and withdraws and unfolds wrap from the mandrel as the casing moves into the wrap.

What is claimed is:

1. A method for packaging shirred essentially cylindrically shaped food causing strands in a particular configuration; wherein, in the configuration, each strand has a strand diameter D, said strands being oriented such that central longitudinal axes of the strands are parallel; external surfaces of the strands contact external surfaces of adjacent strands; ends of the strands terminate in approximately the same plane; said plane being perpendicular to the longitudinal axes of the strands, lines passing perpendicularly through the central axes of strands located proximate the external surface of the configuration intersect to form a hexagon; and strands internally within the configuration encompassed by adjacent strands contact six adjacent strands; and the sides of the hexagon have side lengths such that said lengths vary by less than one D from each other, said configuration consisting essentially of number of rows n of strands, where n is an odd number of rows and row number $(n/2)+\frac{1}{2}$ contains one strand less than row number $(n/2)-\frac{1}{2}$; said method comprising sequentially depositing individual strands into a holder, which, when filled, holds the strands in said configuration; providing a tubular resilient plastic film having a stretched diameter large enough to accommodate the configuration and having a shrunken diameter small enough to tightly engage the external surfaces of strands located proximate the external surface of the configuration; inserting the configuration of strands into the tubular resilient plastic film when the film is stretched and shrinking the film to tightly secure the strands in said configuration.

2. The method of claim 1, wherein the number of strands in rows 1 and $n = (n/2) - \frac{1}{2}$.

3. The method of claim 1 wherein the plastic film is stretched by means of a plurality of fingers inserted inside of the film which are then separated to stretch at least a portion of the film to a size which will accommodate the configuration.

4. The method of claim 3 wherein after the film is stretched, a pushing means pushes the configuration out of an open end of the holder into an open end of the stretched film.

5. The method of claim 4 wherein after the configuration is pushed into the stretched film, the fingers are withdrawn thus permitting the film to relax and secure and retain the configuration.

* * * * *